United States Patent [19]

Belforte et al.

[11] 4,393,494

[45] Jul. 12, 1983

[54] TRANSCEIVER FOR FULL-DUPLEX TRANSMISSION OF DIGITAL SIGNALS OVER A COMMON LINE

[75] Inventors: Piero Belforte, Turin; Renzo Bortignon, Borgara Torinese, both of Italy

[73] Assignee: Cselt Centro Studi e Laboratori Telecomunicazioni S.p.A., Turin, Italy

[21] Appl. No.: 193,009

[22] Filed: Oct. 2, 1980

[30] Foreign Application Priority Data

Oct. 4, 1979 [IT] Italy .................................. 68914 A/79

[51] Int. Cl.$^3$ .......................... H04B 1/56; H04L 5/14
[52] U.S. Cl. ........................................ 370/27; 370/32
[58] Field of Search ............................. 370/27, 32, 24

[56] References Cited

U.S. PATENT DOCUMENTS

| | | | |
|---|---|---|---|
| 3,725,582 | 4/1973 | Davis | 178/58 |
| 3,993,867 | 11/1976 | Blood | 178/58 R |
| 4,112,253 | 9/1978 | Wilhelm | 370/27 |
| 4,152,541 | 5/1979 | Yuen | 178/59 |
| 4,162,371 | 7/1979 | Belforte | 178/58 R |

OTHER PUBLICATIONS

"A Novel High-Speed Interface Circuit Saving Wiring Equipment" by Wilhelm et al., IEEE Journal of Solid-State Circuits, vol. SC-13, No. 3, Jun. 1978, pp. 351-355.

*Primary Examiner*—Douglas W. Olms
*Attorney, Agent, or Firm*—Karl F. Ross

[57] ABSTRACT

A transceiver inserted between a signal source and a two-wire or one-wire line, designed to transmit balanced or unbalanced digital signals to a remote station at the opposite end of the line while receiving similar signals from the latter station, comprises a first and a second amplifier with inputs connected to the line at a proximal and a distal end of a line-terminating impedance, respectively. Each amplifier has an inverting output connected to a noninverting output of the other amplifier, the two nodes formed between the interconnected outputs being connected to respective inputs of a differential third amplifier feeding a signal receiver. The gain of the first amplifier is half that of the second amplifier whereby the locally generated signals are suppressed in the output of the third amplifier. The several amplifiers are realized in integrated circuitry and may be provided with switches for selective changeover between a balanced and an unbalanced mode of operation.

7 Claims, 5 Drawing Figures

TRANSCEIVER FOR FULL-DUPLEX TRANSMISSION OF DIGITAL SIGNALS OVER A COMMON LINE

FIELD OF THE INVENTION

Our present invention relates to a transceiver of a telecommunication system inserted between a signal source and a two-wire or one-wire line designed to carry digital signals in either direction for full-duplex transmission, the transceiver having means for isolating an incoming digital signal from an outgoing one.

BACKGROUND OF THE INVENTION

An interface circuit of the full-duplex type, designed to facilitate the separation of balanced incoming and outgoing signals in such a transceiver, has been described in an article entitled "A NOVEL HIGH-SPEED INTERFACE CIRCUIT SAVING WIRING EQUIPMENT" by Wilhelm Wilhelm, Karl-Reinhard Schön and Hans Kaiser, IEEE Journal of Solid-State Circuits, Vol. SC-13, No. 3, June 1978. According to that article, signal separation is achieved with the aid of a resistor network which can be realized in integrated circuitry also incorporating a number of associated transistors. The network subtracts the locally generated outgoing signal, available at the output of a driving circuit, from a mixture of outgoing and incoming signals present at the distal end of a line-terminating impedance which matches the characteristic impedance of the line and is constituted by a pair of resistors inserted in its two conductors. The latter resistors are part of the integrated circuitry, as are a pair of load resistors through which twin final transistors of the line driver are connected to their power supply.

The known circuit arrangement has the drawback that the resistor network strongly attenuates the outgoing signal so as to require additional amplification at both ends of the line. The incorporation of the line-terminating resistors in the integrated circuitry limits its adaptability to lines of different characteristic impedances. Moreover, an attempt to use that circuitry with an unbalanced line would give rise to an unfavorable signal-to-noise ratio.

OBJECTS OF THE INVENTION

The general object of our present invention, therefore, is to provide an improved circuit arrangement for a transceiver of the above-discussed type which obviates the aforementioned drawbacks.

A more particular object is to provide means in such a circuit arrangement for selectively transmitting and receiving balanced or unbalanced signals with the same high degree of fidelity.

SUMMARY OF THE INVENTION

A transceiver according to our invention, forming part of one of two stations intercommunicating via a line with at least one ungrounded conductor designed for two-way transmission of digital signals, comprises a first and a second amplifier each having an inverting and a noninverting output which are cross-connected so as to form a first junction between the inverting output of the first amplifier and the noninverting output of the second amplifier as well as a second junction between the noninverting output of the first amplifier and the inverting output of the second amplifier. The first amplifier has an input circuit connected to the line at a proximal end of its terminating impedance (as seen from the associated signal source) while the second amplifier has an input circuit connected to the line at the distal end of this impedance. The two amplifiers have a gain ratio substantially suppressing the outgoing signal at the aforementioned junctions which are further connected to respective inputs of a differential amplifier working into a signal receiver.

Pursuant to a more particular feature of our invention, the first and second amplifiers comprise respective pairs of emitter-coupled twin transistors, two of these transistors—one from each pair—having their collectors interconnected to form the first junction while the second junction is formed by interconnected collectors of the other two transistors. The input circuits of these amplifiers connect the base leads of one transistor of each pair to opposite ends of the terminating impedance inserted in an ungrounded line conductor; if the line has two such ungrounded conductors for the transmission of balanced signals, the bases of the other transistors are similarly connected to opposite ends of the terminating impedance inserted in the second conductor.

Advantageously, the latter bases are selectively disconnectable from this second conductor and connectable instead to a source of fixed biasing potential for the transmission of unbalanced signals over a line in which that second conductor is replaced by a ground connection at each station.

BRIEF DESCRIPTION OF THE DRAWING

The above and other features of our invention will now be described in detail with reference to the accompanying drawing in which.

SPECIFIC DESCRIPTION

Figure 1:
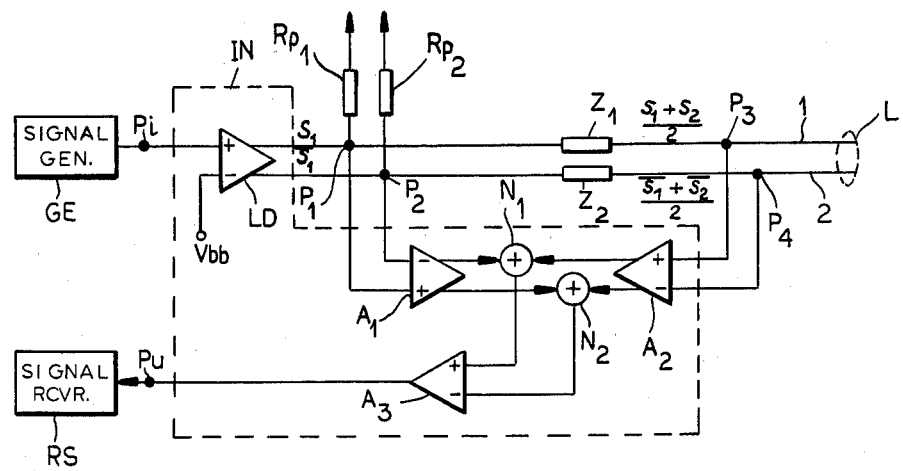
FIG. 1 is a basic diagram showing a transceiver according to our invention connected to a balanced two-wire line.

FIG. 1 shows a transceiver according to our invention connected to a transmission line L with two ungrounded conductors 1 and 2 having respective terminating impedances $Z_1$ and $Z_2$ inserted therein. The transceiver forms part of a station duplicated at the nonillustrated remote end of the line.

A line driver LD, illustrated as a differential amplifier, has a noninverting input connected to a terminal Pi receiving an outgoing digital signal $S_1$ from a local generator GE; an inverting input of driver LD is tied to a source of fixing biasing potential Vbb whose magnitude is midway between the high and the low level of the binary signal $S_1$ appearing in amplified form at a noninverting output of the driver connected to conductor 1. An inverting output of driver LD feeds the complement $\overline{S}_1$ of this signal to line conductor 2. An incoming binary signal $S_2$ and its complement $\overline{S}_2$ are respectively transmitted by the remote station over conductors 1 and 2. With impedances $Z_1$ and $Z_2$ each equaling half the characteristic line impedance, mixed signals of magnitudes $(S_1+S_2)/2$ and $(\overline{S_1+S_2})/2$ are respectively present at the distal ends of impedances $Z_1$ and $Z_2$.

Two branch points $P_1$ and $P_2$ of conductors 1 and 2 at the proximal ends of impedances $Z_1$ and $Z_2$ are respectively connected to a noninverting and an inverting input of a first signal-compensating amplifier $A_1$; two other branch points $P_3$ and $P_4$ at the distal ends of these impedances are respectively connected to a noninverting input and an inverting input of a second signal-compensating amplifier $A_2$. An inverting output of amplifier $A_1$ forms a junction $N_1$ with a noninverting output of amplifier $A_2$; similarly, a noninverting output of amplifier $A_1$ forms a junction $N_2$ with an inverting output of amplifier $A_2$. The two junctions $N_1$ and $N_2$ are connected to a noninverting and an inverting input, respectively, of a differential amplifier $A_3$ working via a terminal Pu into a signal receiver RS.

Amplifiers LD, $A_1$, $A_2$ and $A_3$ are incorporated in an integrated-circuit module IN. Not included in that module are two load resistors $Rp_1$ and $Rp_2$ by which the two branch points $P_1$ and $P_2$ are connected to a nonillustrated supply terminal. Terminals Pi, Pu and branch points $P_1$–$P_4$ may all be constituted by pins of the i-c module IN.

Amplifiers $A_1$ and $A_2$, whose input impedances are assumed to be high, have gains related to each other in a ratio 1:2 so that signal components $S_1$ and $\overline{S_1}$ cancel at junctions $N_1$ and $N_2$. Thus, amplifier $A_3$ transmits only the incoming signal $S_2$ to receiver RS.

Figure 2:
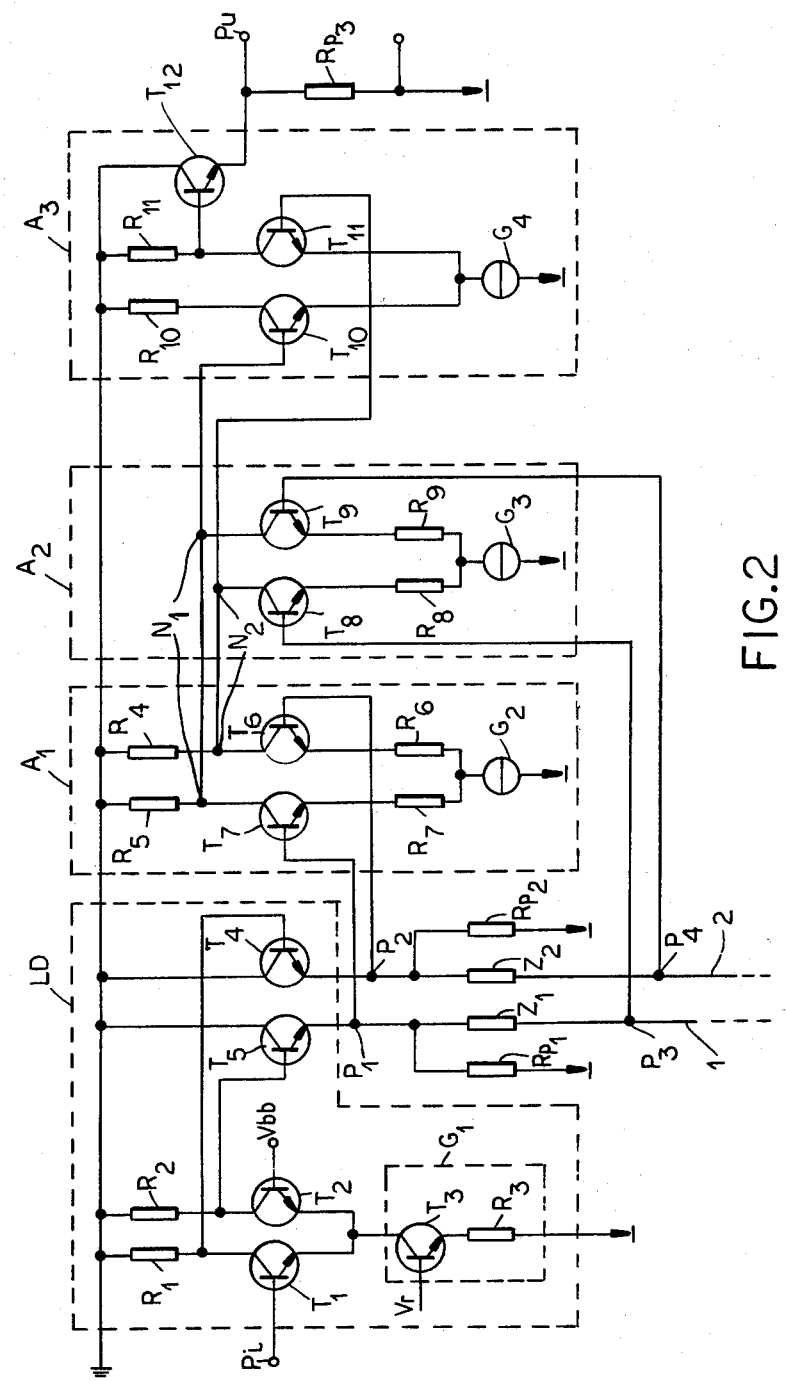
FIG. 2 is a more detailed circuit diagram for the transceiver of FIG. 1.

Reference will now be made to FIG. 2 for a description of structural details of the integrated circuitry included in module IN of FIG. 1. Driver LD comprises two pairs of twin NPN transistors $T_1$,$T_2$ and $T_4$, $T_5$. Transistors $T_1$ and $T_2$ have their collectors grounded through identical resistors $R_1$, $R_2$ as well as tied to the bases of transistors $T_4$ and $T_5$, respectively. The base of transistor $T_1$ is joined to the input terminal Pi while the base of its counterpart $T_2$ receives the biasing potential Vbb. The emitters of these two transistors are jointly connected to the high-voltage terminal (here negative) of the d-c power supply via a further NPN transistor $T_3$ having an emitter resistor $R_3$; transistor $T_3$, whose base receives a negative biasing potential Vr, acts together with resistor $R_3$ as a constant-current generator $G_1$. The collectors of transistors $T_4$ and $T_5$ are grounded while their emitters are connected to branch points $P_1$ and $P_2$ from which the load resistors $Rp_1$ and $Rp_2$ extend to the negative supply terminal.

Amplifier $A_1$ comprises another pair of twin NPN transistors $T_6$ and $T_7$ with bases respectively connected to branch points $P_2$ and $P_1$, collectors grounded through respective resistors $R_4$ and $R_5$ of identical magnitudes, and emitters connected to the negative supply terminal via a pair of identical negative-feedback resistors $R_6$, $R_7$ and a common constant-current generator $G_2$ similar to generator $G_1$. Amplifier $A_2$ is a virtual duplicate of amplifier $A_1$, its twin NPN transistors $T_8$ and $T_9$ having collectors grounded through resistors $R_4$ and $R_5$, emitters connected to negative potential via identical negative-feedback resistors $R_8$, $R_9$ and a constant-current generator $G_3$, and bases respectively tied to branch points $P_3$ and $P_4$. Thus, the interconnected collectors of transistors $T_6$ and $T_8$ form the junction $N_2$ while those of transistors $T_7$ and $T_9$ form the junction $N_1$. Feedback resistors $R_6$–$R_9$ are of such magnitudes that the gain of amplifier $A_1$ is half that of amplifier $A_2$, for the reasons explained with reference to FIG. 1.

Amplifier $A_3$ also comprises twin NPN transistors $T_{10}$ and $T_{11}$ with collectors grounded through identical resistors $R_{10}$ and $R_{11}$, emitters connected to negative potential via a common constant-current generator $G_4$, and bases respectively tied to junctions $N_1$ and $N_2$. The collector of transistor $T_{11}$ is further tied to the base of an NPN output transistor $T_{12}$ with grounded collector and with its emitter tied to terminal Pu; that emitter is further connected through a load resistor $Rp_3$ to the negative supply terminal, the output signal being thus developed across this resistor.

The collector resistors $R_4$ and $R_5$, common to amplifiers $A_1$ and $A_2$, should be of such magnitude in relation to the currents supplied by generators $G_2$ and $G_3$ that transistors $T_6$–$T_9$ operate with maximum switching velocity and on a linear portion of their characteristics, at least over most of the dynamic range of the outgoing signal, for faithful reproduction. The transistors of driving circuit LD and output amplifier $A_3$, on the other hand, may operate on nonlinear portions of their characteristics for optimum gain.

The differential mode of operation of the transistor pairs of stages LD, $A_1$, $A_2$ and $A_3$ effectively suppresses common-mode noise as is necessary with balanced signals. The subtraction of the locally generated outgoing signal $S_1$ from the composite line signal $S_1+S_2$ is carried out entirely within the integrated circuitry so that impedance variations due to temperature changes and other external factors affect both signal components in essentially the same way.

Figure 3:
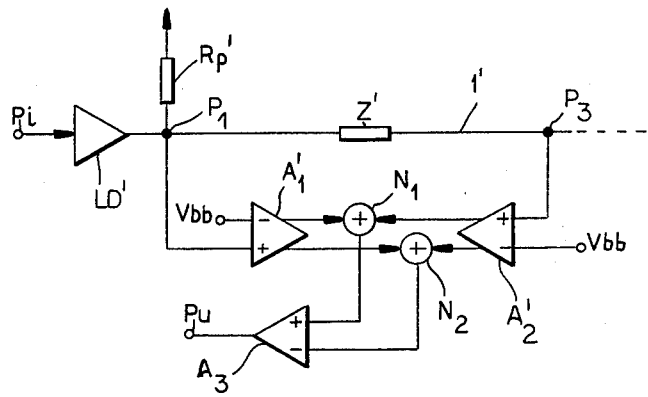
FIG. 3 shows a basic diagram similar to that of FIG. 1 but relating to a transceiver connected to an unbalanced one-wire line.

FIG. 3 shows a modified transceiver connected to a line with only one live conductor 1' having a terminating impedance Z' inserted therein. The outgoing signal from terminal Pi is delivered by a driver LD' to the branch point $P_1$ at the proximal end of this impedance which is connected to the high-voltage supply terminal through a load resistor Rp' and is tied to the noninverting input of a first signal-compensating amplifier $A_1'$ whose inverting input receives the fixed biasing potential Vbb. Similarly, branch point $P_3$ at the distal end of impedance Z' is tied to the noninverting input of a second signal-compensating amplifier $A_2'$ whose inverting input receives the potential Vbb. The cross-connected outputs of amplifiers $A_1'$ and $A_2'$ form junctions $N_1$ and $N_2$ again connected to respective inputs of differential amplifier $A_3$.

Figure 4:
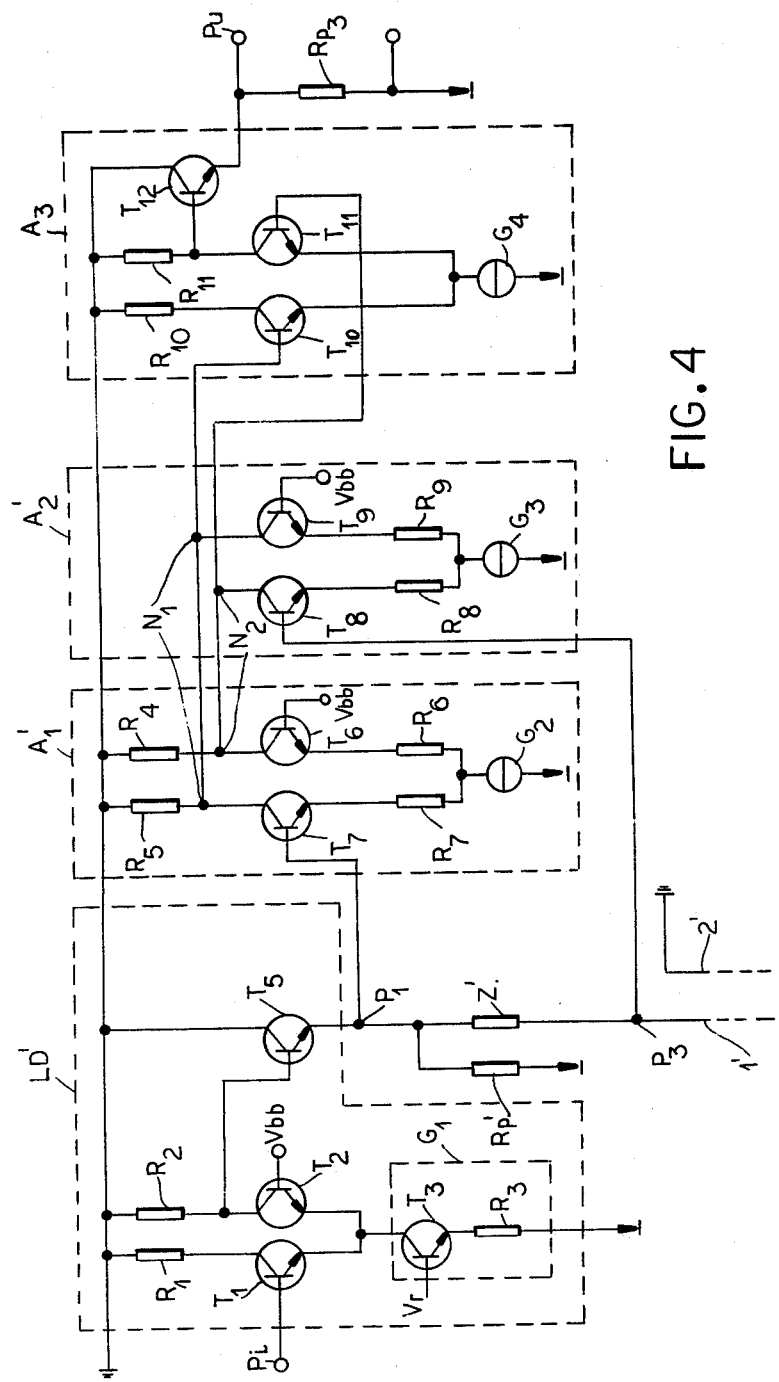
FIG. 4 is a circuit diagram similar to that of FIG. 2 but relating to the transceiver of FIG. 3.

FIG. 4 illustrates the circuitry of stages LD', $A_1'$, $A_2'$ and $A_3$, the latter being identical with that shown in FIG. 2. Driver LD' differs from driver LD by the omission of transistor $T_4$; amplifiers $A_1'$ and $A_2'$ are structurally identical with their counterparts $A_1$ and $A_2$ in FIG. 2, yet the bases of their transistors $T_6$ and $T_9$ are connected to fixed potential Vbb.

FIG. 4 also shows a ground connection 2' replacing the second line conductor of FIGS. 1 and 2.

Figure 5:
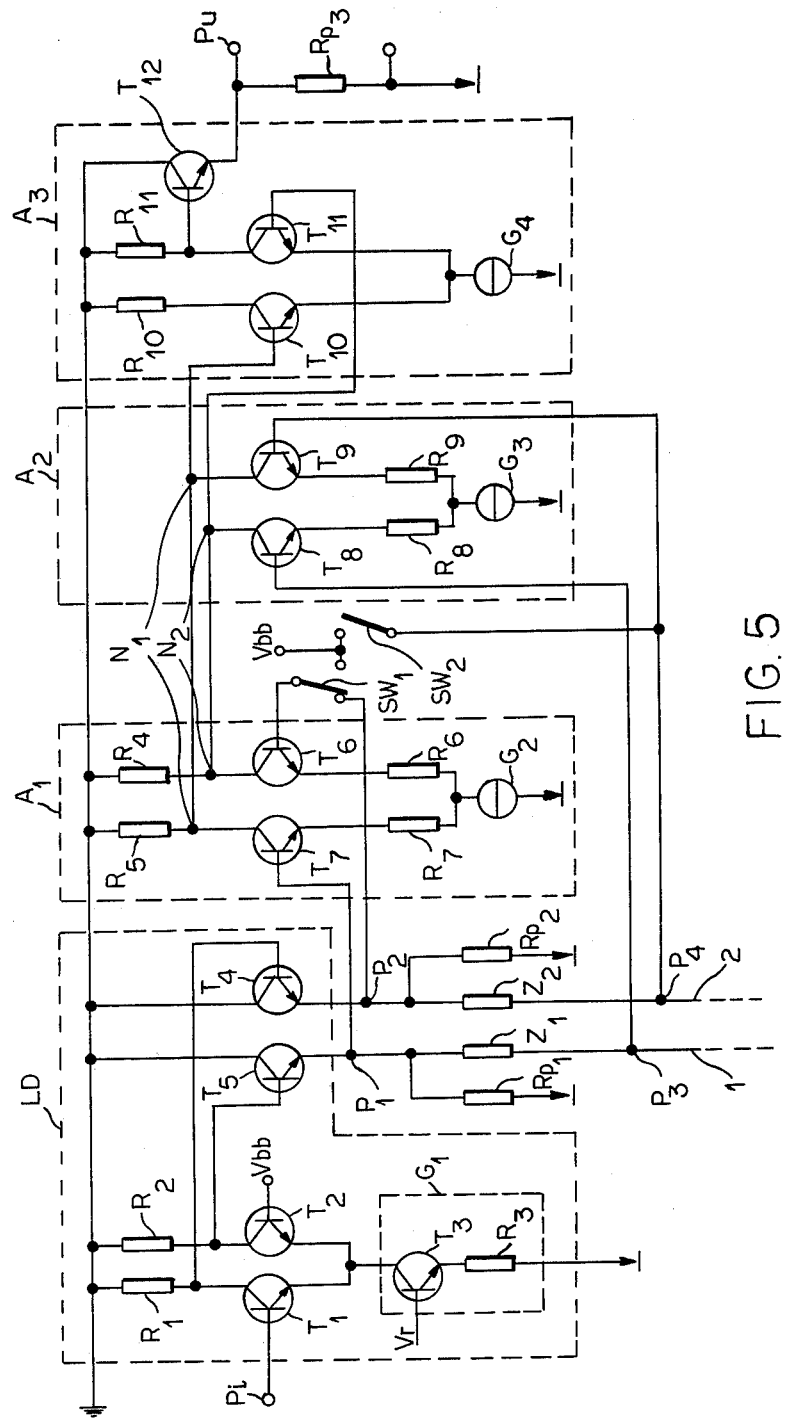
FIG. 5 shows a modification of the circuit diagram of FIG. 1 enabling selective switching between unbalanced and balanced signal transmission.

In FIG. 5 we have illustrated the possibility of selectively changing over between balanced and unbalanced signal transmission according to FIGS. 2 and 4, respectively. Thus, stages LD, $A_1$, $A_2$, $A_3$ are the same as in FIG. 2, yet a manually operable switch $SW_1$ has been inserted in the base lead of transistor $T_6$ for disconnecting same from branch point $P_2$ and connecting the base of that transistor instead to potential Vbb. A similar switch $SW_2$, which may be ganged with switch $SW_1$, is operable to apply the biasing potential Vbb to the base of transistor $T_9$ when conductor 2 is absent (in which case a nonillustrated further switch may be used to disconnect the branch point P₂ and thus the emitter of transistor T₄ from the power supply).

It will be apparent that the system could also operate with positive instead of negative supply and biasing voltages, the transistors shown in FIGS. 2, 4 and 5 then being of the PNP type.

We claim:

1. A transceiver inserted between a signal source and a line with at least one ungrounded conductor designed for two-way transmission of digital signals, said conductor being provided with a terminating impedance having a proximal end and a distal end as seen from said signal source, comprising:
   a first pair of emitter-coupled twin transistors with respective first bases, with an inverting and a noninverting first output connected to respective first collectors thereof and with a first input circuit including a connection from one of said first bases to said conductor at said proximal end for picking up an outgoing signal originating at said signal source;
   a second pair of emitter-coupled twin transistors with respective second bases, with an inverting and a noninverting second output connected to respective second collectors thereof and with a second input circuit including a connection from one of said second bases to said conductor at said distal end for picking up a mixture of said outgoing signal with an incoming signal, said first inverting output being directly connected to said second noninverting output at a first junction, said first noninverting output being directly connected to said second inverting output at a second junction, said first and second pairs having a gain ratio substantially suppressing said outgoing signal at said junctions; and
   a differential amplifier with inputs respectively connected to said junctions and with an output connected to a signal receiver.

2. A transceiver as defined in claim 1 wherein said line has another ungrounded conductor provided with a second terminating impedance having a proximal end and a distal end, said first input circuit further including a connection from the other of said first bases to the proximal end of said second terminating impedance, said second input circuit further including a connection from the other of said second bases to the distal end of said second terminating impedance.

3. A transceiver as defined in claim 2, further comprising switch means for selectively connecting said other of said first and second bases to a source of fixed biasing potential upon elimination of said second conductor.

4. A transceiver as defined in claims 1, 2 or 3 wherein said differential amplifier comprises a third pair of twin transistors with bases respectively connected to said junctions.

5. A transceiver as defined in claim 4 wherein said junctions are grounded through a pair of identical collector resistors, the transistors of said third pair having collectors grounded through another pair of identical collector resistors, the transistors of said first pair having emitters connected to a supply terminal through one pair of identical negative-feedback resistors in series with a first constant-current generator, the transistors of said second pair having emitters connected to said supply terminal through another pair of identical negative-feedback resistors in series with a second constant-current generator, the transistors of said third pair having emitters connected to said supply terminal through a third constant-current generator.

6. A transceiver as defined in claim 5, further comprising a driving circuit inserted between the line and said signal source, said driving circuit including a fourth pair of twin transistors with collectors grounded through a further pair of identical collector resistors, emitters connected to said supply terminal through a fourth constant-current generator, and at least one base connected to said signal source.

7. A transceiver as defined in claim 6 wherein said driving circuit, said first pair, said second pair and said differential amplifier are realized in integrated circuitry.

* * * * *